(12) United States Patent  
Roelens

(10) Patent No.: US 7,430,361 B2  
(45) Date of Patent: Sep. 30, 2008

(54) PROCESS AND DEVICE FOR DECODING MPEG PICTURES AND FOR DISPLAYING THEM IN REWIND MODE, VIDEO DRIVER CIRCUIT AND DECODER BOX INCORPORATING SUCH A DEVICE

(76) Inventor: Frederic Roelens, 14, rue Cabanis, 75014 Paris (FR)

( * ) Notice: Subject to any disclaimer, the term of this patent is extended or adjusted under 35 U.S.C. 154(b) by 1043 days.

(21) Appl. No.: 10/741,821

(22) Filed: Dec. 19, 2003

(65) Prior Publication Data

US 2004/0190867 A1     Sep. 30, 2004

(30) Foreign Application Priority Data

Dec. 20, 2002    (FR)    .................................... 02 16328

(51) Int. Cl.
*H04N 5/91* (2006.01)
*H04N 5/92* (2006.01)
*H04N 5/93* (2006.01)

(52) U.S. Cl. ......................................... 386/68; 386/112

(58) Field of Classification Search .................... 386/1, 386/6–8, 33, 46, 52–54, 68, 112, 111, 121, 386/122–123

See application file for complete search history.

(56) References Cited

U.S. PATENT DOCUMENTS 6,553,183 B1 *   4/2003   Kataoka ..................... 386/112

FOREIGN PATENT DOCUMENTS

| EP | 0735780 A2 | 10/1996 |
| EP | 1003339 A1 | 5/2000 |
| EP | 1005226 A2 | 5/2000 |
| WO | WO01/37572 A1 | 5/2001 |

OTHER PUBLICATIONS

Preliminary Search Report for French Application No. 0216328 dated Sep. 24, 2003.

* cited by examiner

*Primary Examiner*—Thai Q. Tran
*Assistant Examiner*—Michael P Choi

(57) ABSTRACT

A process for decoding and for displaying in rewind mode pictures of a stream of picture data compressed according to the MPEG standard using a specified number N of frame memories each adapted for storing a decoded picture, where N is an integer greater than or equal to 4, applies rules for selecting a frame memory when a frame memory is to be overwritten so as to allow the storage of a new picture to be decoded.

35 Claims, 6 Drawing Sheets

| No. | address | type/time stamp/direct access point |
|---|---|---|
| 0 | 0000096a | (P11) |
| 1 | 000057e6 | (B10) |
| 2 | 00007ba9 | (I 1)* |
| 3 | 000155b6 | (B 0) |
| 4 | 00017932 | (P 3) |
| 5 | 0001c60e | (B 2) |
| 6 | 0001ee1e | (P 5) |
| 7 | 00023526 | (B 4) |
| 8 | 00025dde | (P 7) |
| 9 | 0002a776 | (B 6) |
| 10 | 0002cea2 | (P 9) |
| 11 | 00031816 | (B 8) |
| 12 | 00033cf6 | (P11) |
| 13 | 000386aa | (B10) |
| 14 | 0003af9d | (I 1)* |
| 15 | 00049876 | (B 0) |
| 16 | 0004bf5e | (P 3) |
| 17 | 000509b2 | (B 2) |
| 18 | 0005300e | (P 5) |
| 19 | 000578de | (B 4) |
| 20 | 00059e66 | (P 7) |
| 21 | 0005e7e2 | (B 6) |
| 22 | 00060b0e | (P 9) |
| 23 | 0006559e | (B 8) |
| 24 | 00067bce | (P11) |
| 25 | 0006c0ce | (B10) |
| 26 | 0006e9e1 | (I 1)* |
| 27 | 0007d626 | (B 0) |

FIG. 3

| N | address | type/stamp | single identifier | earlier reference | later reference |
|---|---------|------------|-------------------|-------------------|-----------------|
| 0 : | 0000096a | (P11) | (65506) | ???? N | ???? |
| 1 : | 000057e6 | (B10) | (65505) | ???? | 0(P11) ???? |
| 2 : | 00007ba9 | (I 1)* | (65508) | N | N |
| 3 : | 000155b6 | (B 0) | (65507) | 0(P11) | 2(I 1) ???? |
| 4 : | 00017932 | (P 3) | (65510) | 2(I 1) | N |
| 5 : | 0001c60e | (B 2) | (65509) | 2(I 1) | 4 (P 3) |
| 6 : | 0001ee1e | (P 5) | (65512) | 4(P 3) | N |
| 7 : | 00023526 | (B 4) | (65511) | 4(P 3) | 6 (P 5) |
| 8 : | 00025dde | (P 7) | (65514) | 6(P 5) | N |
| 9 : | 0002a776 | (B 6) | (65513) | 6(P 5) | 8 (P 7) |
| 10 : | 0002cea2 | (P 9) | (65516) | 8(P 7) | N |
| 11 : | 00031816 | (B 8) | (65515) | 8(P 7) | 10(P 9) |
| 12 : | 00033cf6 | (P11) | (65518) | 10(P 9) | N |
| 13 : | 000386aa | (B10) | (65517) | 10(P 9) | 12(P11) |
| 14 : | 0003af9d | (I 1)* | (65520) | N | N |
| 15 : | 00049876 | (B 0) | (65519) | 12(P11) | 14(I 1) |
| 16 : | 0004bf5e | (P 3) | (65522) | 14(I 1) | N |
| 17 : | 000509b2 | (B 2) | (65521) | 14(I 1) | 16(P 3) |
| 18 : | 0005300e | (P 5) | (65524) | 16(P 3) | N |
| 19 : | 000578de | (B 4) | (65523) | 16(P 3) | 18(P 5) |
| 20 : | 00059e66 | (P 7) | (65526) | 18(P 5) | N |
| 21 : | 0005e7e2 | (B 6) | (65525) | 18(P 5) | 20(P 7) |
| 22 : | 00060b0e | (P 9) | (65528) | 20(P 7) | N |
| 23 : | 0006559e | (B 8) | (65527) | 20(P 7) | 22(P 9) |
| 24 : | 00067bce | (P11) | (65530) | 22(P 9) | N |
| 25 : | 0006c0ce | (B10) | (65529) | 22(P 9) | 24(P11) |
| 26 : | 0006e9e1 | (I 1)* | (65532) | N | N |
| 27 : | 0007d626 | (B 0) | (65531) | 24(P11) | 26(I 1) ???? |

| N | address | type/stamp | PTS | single identifier |
|---|---|---|---|---|
| 0 | 0000096a | (P11) | 0x0ef86cb | (65506) |
| 1 | 000057e6 | (B10) | 0x0ef78bb | (65505) |
| 2 | 00007ba9 | (I 1) | 0x0efa2eb | (65508) |
| 3 | 000155b6 | (B 0) | 0x0ef94db | (65507) |
| 4 | 00017932 | (P 3) | 0x0efbf0b | (65510) |
| 5 | 0001c60e | (B 2) | 0x0efb0fb | (65509) |
| 6 | 0001ee1e | (P 5) | 0x0efdb2b | (65512) |
| 7 | 00023526 | (B 4) | 0x0efcd1b | (65511) |
| 8 | 00025dde | (P 7) | 0x0eff74b | (65514) |
| 9 | 0002a776 | (B 6) | 0x0efe93b | (65513) |
| 10 | 0002cea2 | (P 9) | 0x0f0136b | (65516) |
| 11 | 00031816 | (B 8) | 0x0f0055b | (65515) |
| 12 | 00033cf6 | (P11) | 0x0f02f8b | (65518) |
| 13 | 000386aa | (B10) | 0x0f0217b | (65517) |
| 14 | 0003af9d | (I 1) | 0x0f04bab | (65520) |
| 15 | 00049876 | (B 0) | 0x0f03d9b | (65519) |
| 16 | 0004bf5e | (P 3) | 0x0f067cb | (65522) |
| 17 | 000509b2 | (B 2) | 0x0f059bb | (65521) |
| 18 | 0005300e | (P 5) | 0x0f083eb | (65524) |
| 19 | 000578de | (B 4) | 0x0f075db | (65523) |
| 20 | 00059e66 | (P 7) | 0x0f0a00b | (65526) |
| 21 | 0005e7e2 | (B 6) | 0x0f091fb | (65525) |
| 22 | 00060b0e | (P 9) | 0x0f0bc2b | (65528) |
| 23 | 0006559e | (B 8) | 0x0f0ae1b | (65527) |
| 24 | 00067bce | (P11) | 0x0f0d84b | (65530) |
| 25 | 0006c0ce | (B10) | 0x0f0ca3b | (65529) |
| 26 | 0006e9e1 | (I 1) | 0x0f0f46b | (65532) |
| 27 | 0007d626 | (B 0) | 0x0f0e65b | (65531) |

FIG. 6

```
    N   address  type/stamp        PTS |single identifier
|   0 : 00080000  (P  3)         0x0edc4cb|   (???)
|   1 : 00083dc2  (B  2)         0x0edb6bb|   (???)
|   2 : 00086436  (P  5)         0x0ede0eb|   (???)
|   3 : 0008acf2  (B  4)         0x0edd2db|   (???)
|   4 : 0008d122  (P  7)         0x0edfd0b|   (???)
|   5 : 00091bea  (B  6)         0x0edeefb|   (???)
|   6 : 00093fe2  (P  9)         0x0ee192b|   (???)
|   7 : 00098b8a  (B  8)         0x0ee0b1b|   (???)
|   8 : 0009b0fa  (P11)          0x0ee354b|   (???)
|   9 : 0009f92a  (B10)          0x0ee273b|   (???)
|  10 : 000a21c9  (I  1)         0x0ee516b|   (???)
|  11 : 000affd6  (B  0)         0x0ee435b|   (???)
|  12 : 000b241e  (P  3)         0x0ee6d8b|   (???)
|  13 : 000b6f76  (B  2)         0x0ee5f7b|   (???)
|  14 : 000b93ba  (P  5)         0x0ee89ab|   (???)
|  15 : 000bdbf6  (B  4)         0x0ee7b9b|   (???)
|  16 : 000c038e  (P  7)         0x0eea5cb|   (???)
|  17 : 000c4866  (B  6)         0x0ee97bb|   (???)
|  18 : 000c71de  (P  9)         0x0eec1eb|   (???)
|  19 : 000cb90e  (B  8)         0x0eeb3db|   (???)
|  20 : 000ce0c2  (P11)          0x0eede0b|   (???)
|  21 : 000d2b7a  (B10)          0x0eecffb|   (???)
|  22 : 000d51b1  (I  1)         0x0eefa2b|   (???)
|  23 : 000e2202  (B  0)         0x0eeec1b|   (???)
|  24 : 000e45c6  (P  3)         0x0ef164b|   (???)
|  25 : 000e922e  (B  2)         0x0ef083b|   (???)
|  26 : 000eb922  (P  5)         0x0ef326b|   (???)
|  27 : 000eff92  (B  4)         0x0ef245b|   (???)
|  28 : 000f2a46  (P  7)         0x0ef4e8b|   (???)
|  29 : 000f6fda  (B  6)         0x0ef407b|   (???)
|  30 : 000f99b2  (P  9)         0x0ef6aab|   (???)
|  31 : 000fe402  (B  8)         0x0ef5c9b|   (???)
|  32 : 000ff800  (P11)          0x0ef86cb|   (???)
```

FIG. 7

```
   N    address   type/stamp        PTS |single identifier
|  0 :  00080000   (P  3)        0x0edc4cb|(65474)
|  1 :  00083dc2   (B  2)        0x0edb6bb|(65473)
|  2 :  00086436   (P  5)        0x0ede0eb|(65476)
|  3 :  0008acf2   (B  4)        0x0edd2db|(65475)
|  4 :  0008d122   (P  7)        0x0edfd0b|(65478)
|  5 :  00091bea   (B  6)        0x0edeefb|(65477)
|  6 :  00093fe2   (P  9)        0x0ee192b|(65480)
|  7 :  00098b8a   (B  8)        0x0ee0b1b|(65479)
|  8 :  0009b0fa   (P11)         0x0ee354b|(65482)
|  9 :  0009f92a   (B10)         0x0ee273b|(65481)
| 10 :  000a21c9   (I  1)        0x0ee516b|(65484)
| 11 :  000affd6   (B  0)        0x0ee435b|(65483)
| 12 :  000b241e   (P  3)        0x0ee6d8b|(65486)
| 13 :  000b6f76   (B  2)        0x0ee5f7b|(65485)
| 14 :  000b93ba   (P  5)        0x0ee89ab|(65488)
| 15 :  000bdbf6   (B  4)        0x0ee7b9b|(65487)
| 16 :  000c038e   (P  7)        0x0eea5cb|(65490)
| 17 :  000c4866   (B  6)        0x0ee97bb|(65489)
| 18 :  000c71de   (P  9)        0x0eec1eb|(65492)
| 19 :  000cb90e   (B  8)        0x0eeb3db|(65491)
| 20 :  000ce0c2   (P11)         0x0eede0b|(65494)
| 21 :  000d2b7a   (B10)         0x0eecffb|(65493)
| 22 :  000d51b1   (I  1)        0x0eefa2b|(65496)
| 23 :  000e2202   (B  0)        0x0eeec1b|(65495)
| 24 :  000e45c6   (P  3)        0x0ef164b|(65498)
| 25 :  000e922e   (B  2)        0x0ef083b|(65497)
| 26 :  000eb922   (P  5)        0x0ef326b|(65500)
| 27 :  000eff92   (B  4)        0x0ef245b|(65499)
| 28 :  000f2a46   (P  7)        0x0ef4e8b|(65502)
| 29 :  000f6fda   (B  6)        0x0ef407b|(65501)
| 30 :  000f99b2   (P  9)        0x0ef6aab|(65504)
| 31 :  000fe402   (B  8)        0x0ef5c9b|(65503)
+-----------------------------------------------+
| 32 :  0000096a   (P11)         0x0ef86cb|(65506)
| 33 :  000057e6   (B10)         0x0ef78bb|(65505)
| 34 :  00007ba9   (I  1)        0x0efa2eb|(65508)
| 35 :  000155b6   (B  0)        0x0ef94db|(65507)
| 36 :  00017932   (P  3)        0x0efbf0b|(65510)
```

FIG. 8

PROCESS AND DEVICE FOR DECODING MPEG PICTURES AND FOR DISPLAYING THEM IN REWIND MODE, VIDEO DRIVER CIRCUIT AND DECODER BOX INCORPORATING SUCH A DEVICE

CROSS-REFERENCE TO RELATED APPLICATIONS

This application is based upon and claims priority from prior French Patent Application No. 0216328, filed on Dec. 20, 2002 the entire disclosure of which is herein incorporated by reference.

FIELD OF THE INVENTION

The present invention generally relates to the field of decoding and to the displaying of audiovisual programs contained in a stream of compressed digital data.

BACKGROUND OF THE INVENTION

The decoders concerned are in particular decoder boxes ("Set-Top Boxes") catering for the interface between an inlet for digital signals broadcast in real time by satellite, by cable or by terrestrial digital broadcasting (or DVB, standing for "Digital Video Broadcasting") on the one hand, and an analog television on the other hand. Such a decoder box is a standalone apparatus. However, the invention applies also to integrated decoders built into a digital television, or to a digital read/record apparatus such as a DVD reader, a digital video cassette reader or the like.

A decoder box receives one or more programs in the form of a stream of compressed digital data, that is to say whose video frames (i.e. pictures) and audio frames are coded in such a way as to reduce the volume of the data broadcast. For example, this coding complies with the specifications of the MPEG-2 standard (ISO/IEC 13818-2) hereinafter the MPEG standard ("Motion Pictures Expert Group"). This standard defines a data compression technique for the coding of moving pictures and sound (in particular for digital television).

In the present description, the term "presentation", when it is used in relation to a program, denotes the restoring of the decoded audio and video data, in audible and visible form respectively by a user. The term "playback" (or "reading"), used in relation to a program, more specifically denotes the decoding and the displaying of the program from a recording of the program on a hard disk. The term display is more particularly used to designate the presentation of the video frames.

The hard disk makes it possible to offer a number of functionalities, in particular the implementing of advanced modes of playback (or "trick modes"), that is to say a reading at a speed different from a nominal forward speed (×1), in particular fast forward and rewind at high speed or otherwise.

The difficulties encountered nowadays in the implementation of this latter functionality originate from the fact that the MPEG stream is, by nature, adapted to forward reading. Specifically, the pictures are transmitted in an order intended to facilitate forward decoding. For rewind reading, this order of transmission necessitates the availability of computational resources whose decoding rate is sufficient to carry out all the decoding operations required for decoding each picture. Failing this, a large storage capacity needs to be available for storing all the decoded pictures (i.e. the data of pictures after decompression) onwards of the start of a Group Of Pictures (or GOP) within the meaning of the MPEG standard, insofar as the pictures of the start of the GOP can again serve for the decoding of a next picture in the GOP. This storage capacity is supplied by frame memories, each of which is adapted for storing the data of a decoded picture.

In European Patent Application EP-A-0 735 780 there is proposed a technique for the rewind reading of an MPEG video stream using the same number of frame memories as for forward reading. This number is equal to three. Nevertheless, the method consists in skipping the B pictures, and in decoding a maximum of only three I or P pictures, then in going to the previous GOP (in the forward order of display) as soon as this number is reached.

International Patent Application WO 01/37572 proposes, for the rewind reading of an MPEG video stream, a technique making it possible to display all the pictures of a GOP. The technique consists in temporarily storing, in a minimum of four frame memories, the decompressed data of certain pictures which are useful in the subsequent decoding of several pictures to be displayed, rather than in recommencing the successive decoding operations from the beginning of the GOP. This document describes an exemplary GOP that can thus be decoded in its entirety by using four frame memories only. This example corresponds to the case of the reading of a program stored on a DVD, with GOPs containing a limited number of pictures. However, no guarantee is provided as to the result of the technique.

According what is needed is a method and system to overcome the problems encountered in the prior art and to optimize the use of the frame memories available for the backward displaying of pictures of an MPEG video stream, in particular an MPEG video stream, stored on the hard disk of a decoder box.

SUMMARY OF THE INVENTION

A first aspect of the invention thus provides a method for decoding and for displaying in rewind mode pictures of a stream of picture data compressed according to the MPEG standard using a specified number N of frame memories each adapted for storing a decoded picture, where N is an integer greater than or equal to 4. The following rules are applied when a frame memory is to be overwritten so as to allow the storage of a new picture to be decoded:

a frame memory in which an obsolete picture is stored, that is to say a picture which has already been displayed and which is no longer required for performing a next picture decoding, is overwritten by priority or, failing this, a frame memory, in which a picture which exhibits a minimum decoding cost is stored, is overwritten by priority;

a frame memory, in which a picture which is currently being displayed is stored, cannot be overwritten;

a frame memory, in which a picture which is ready for display but has not yet been displayed is stored, cannot be overwritten;

a frame memory, in which a reference picture required for the decoding of the new picture to be decoded is stored, also cannot be overwritten;

if no frame memory can be overwritten by applying the above rules, the decoding is suspended until the displaying of a picture which is ready for display and these rules are re-evaluated after this display.

The fact that a picture satisfies the condition according to which a picture has already been displayed and is no longer required for the decoding of another picture, (in particular another picture to be decoded so as to obtain the next picture to be displayed) can be determined from an indexation table in its enhanced version (as described below).

These rules make it possible to attain an optimal result in terms of continuity of display, according in particular to the rate of decoding for a given display speed. When no frame memory can be overwritten for the storage of the new picture to be decoded by applying the first five rules, the last rule leads to waiting until there is one which can be used, this occurring when a picture which is ready for display by being stored in one of the frame memories is displayed. The process can be carried out using a number N of frame memories which is ideally as large as possible. The process produces its effects as soon as N is less than the number of pictures contained in a GOP, or Group Of Pictures within the meaning of the MPEG standard. As a minimum, N must be equal to four. By using these memories according to the process, the total number of decoding operations to be carried out so as to display the pictures backwards is limited. When N is equal to four, one of the frame memories is used to store the picture currently being displayed, and, among the other three, one can be used to receive the decompressed data of the picture to be decoded and the other two to store the at most two reference pictures required for this purpose (if the picture to be decoded is a B picture). Of course, the assignment of the frame memories evolves dynamically in a non-deterministic manner.

Advantageously, the type I pictures exhibit a first specified decoding cost; the type P pictures predicted from a type I picture exhibit a second decoding cost, greater than the first decoding cost; and the type P pictures predicted from another type P picture exhibit a decoding cost greater than the decoding cost of the other type P picture.

For example, if the cost of decoding an I picture is equal to unity, the cost of decoding a P picture predicted from n reference pictures (previous I picture and/or P picture(s), exhibit is equal to n+1.

Preferably, the B type pictures are considered to be the same decoding cost as the I pictures, since they are decoded only when they are displayed and can be overwritten immediately afterwards (since a B picture is not a reference picture serving for the decoding of another picture).

In an advantageous mode of implementation, a check is carried out to verify, before decoding a next picture to be displayed, whether it is not already stored in any one of the frame memories. In this case indeed, it is unnecessary to decode it again.

In respect of display, the process can comprise steps consisting in determining at each picture display synchronization event whether the frame memories contain a picture which is ready for display. Such an event corresponds for example to a pulse of the vertical synchronization (Signal Vsync) for the screen of an analog television. A picture which is ready for display is understood to be a decoded picture following on from, in the backward order of display of the pictures, the pictures which have already been displayed. If such a picture is present then it is displayed, and it is marked as obsolete after display if it is no longer required in order to perform a picture decoding, that is to say if it is not a reference picture for another picture to be decoded/displayed. The verification of this latter condition can advantageously be based on the content of an enhanced indexation table (see later) associated with the stream portion contained in the buffer memory. If conversely no such picture is present, the displaying of the picture displayed at the previous picture display synchronization event is repeated. This amounts to performing a picture freeze, which is preferable to a lack of picture appearing as a black picture on the screen.

One embodiment of the present invention is particularly suited to applications where the compressed data stream is read in portions from a mass storage digital medium, for example a hard disk, in response to a rewind mode read command.

One mode of implementation of the invention comprises the steps consisting in:
  a) loading a portion of the stream into a buffer memory;
  b) analysing the portion of the stream so as to identify the access point of a decodable group of pictures and to determine at least for each of the pictures of the group, information including the address of the picture in the buffer memory, a presentation time stamp associated with an order of forward display of the picture, and the type I, P or B of the picture, and storing the information in a specified indexation table (or "Trick Mode Table");
  c) obtaining an enhanced indexation table by supplementing the indexation table obtained in step b by specifying for each picture of type P or B its reference picture or pictures;
  d) from the indexation table, determining for a next picture to be displayed, a reconstruction list ("Trick List") which is an ordered list of the reference pictures to be decoded sequentially onwards of the access point so as to obtain the next picture to be displayed;
  e) from the reconstruction list, obtaining the next picture to be displayed by decoding all or some of the pictures of the reconstruction list.

A decodable group of pictures is a group of consecutive pictures of the screen which can be decoded without needing to know pictures other than those of the group (except in respect of the pictures constituting what is called a broken link in the MPEG standard. Typically, such a group corresponds to a GOP, although a GOP may sometimes contain several such decodable groups of pictures. An access point, within the meaning of the MPEG standard, is an I picture from which it is possible to decode a following group of pictures in the stream.

Preferably, the method comprises, between step b) and step c), the allocating to each of the coded pictures in the first portion of the stream of a unique identification number enabling it to be identified unequivocally in the stream.

In an example, the identification numbers are allocated to the pictures sequentially coded in the stream, according to the order of display of the pictures. For this purpose, the aforesaid PTSs are used.

Thus, in step d), the next picture to be displayed in rewind mode and which has not been decoded can be determined from its identification number, by counting down the identification numbers.

The identification number of the pictures is for example coded on 32 bits, and is initialized to the value h0x800000 (that is to say 0x800000 in hexadecimal notation) and is respectively incremented or decremented by one unit depending on whether the stream is being traversed forwards and backwards. Thus, this allows the forward or backward reading of several hours of video.

Advantageously, to obtain the next picture, a check is carried out to verify whether one at least of the pictures of its reconstruction list is not already stored in any one of the frame memories. If so, the sequential decoding of the pictures of the list is commenced not from the access point of the decodable group of pictures but from the already stored picture, or, as appropriate, from those of the already stored pictures which exhibit the highest decoding cost. One thus avoids having to redo the decoding operations which have already been performed and whose result is still available in the frame memories.

In an advantageous mode of implementation, each time a picture is displayed, a delay with respect to a theoretical display speed (for example the nominal speed ×1 if display is in rewind mode at normal speed). Moreover, in step d), the next picture to be displayed is determined in such a way as to cancel the delay by skipping pictures (that is to say by not decoding them and by not displaying them), according to the following priority rules:

one or more B pictures is or are skipped by priority;

if one or more skips of B pictures is or are not sufficient to cancel the delay, then one or more P pictures is or are skipped;

if one or more skips of P pictures is or are not sufficient to cancel the delay, then one or more portions of the data stream is or are skipped during the loading, in step a), of a next portion of the data stream into the buffer memory.

These rules make it possible in particular to determine whether it is necessary to carry out skips in the pictures to be displayed, as a function of the delay taken in the display with respect to the nominal speed, or even whether a portion of the stream cannot be decoded. Thus, it is possible to compensate for the delays of the decoding procedure with respect to the display procedure.

Preferably, the buffer memory comprises a first and a second memory bank. Steps d) and e) are carried out in the first memory bank for a first portion of the stream of the buffer memory, while steps a) to c) are carried out in the second memory bank for a second portion of the stream. The decoding procedure is thus more fluid.

Advantageously, the buffer memory is loaded in such a way that one or the other of the first and second memory banks is not overwritten in step a) as long as the data which it contains are still required for the processing of the data contained in the other of the first and second memory banks.

Preferably, one or the other of the first and second memory banks is overwritten with a new portion of the stream in step a), as soon as the data which it contains are no longer required for the processing of the data contained in the other of the first and second memory banks. Thus, a minimum of time is lost before being able to embark on the decoding procedure for a following portion of the stream.

Advantageously, the stream portions loaded into the first memory bank and into the second memory bank overlap, and a join between these two portions can be effected between the two parts of the stream at the level of a common picture. This is especially advantageous when the stream is scrambled. Specifically, it is then impossible to curve the data stream exactly between two pictures.

It will be noted that the indexation table can then advantageously be common for the two portions of the stream.

It should be noted that, with the aim of generalization, the description here is from the picture level standpoint, but that the process applies in the same manner to each frame of a picture in the case of an interleaved display system.

A second aspect of the invention pertains to a device comprising means for the implementation of the above process.

A third aspect of the invention pertains to a video driver circuit comprising a device according to the second aspect.

Yet another aspect of the invention relates to a decoder box (set-top box) comprising a video driver circuit according to the third aspect.

The present invention has been shown to be used advantageously in video decoders comprising a personal digital recording functionality (PVR, standing for "Personal Video Recorder"). In such decoders, a recording of programs is made on a mass storage digital medium (or DSM, standing for "Digital Storage Media") such as a hard disk, a digital video cassette, a DVD ("Digital Versatile Disk"), etc.

BRIEF DESCRIPTION OF THE DRAWING

The subject matter, which is regarded as the invention is particularly pointed out and distinctly claimed in the claims at the conclusion of the specification. The foregoing and other features, and advantages of the invention will be apparent from the following detailed description taken in conjunction with the accompanying drawings in which:

FIG. 3 depicts an indexation table such as constructed in step b) of an embodiment of the present invention;

FIG. 6 depicts the content of an indexation table relating to a first portion of stream in a first memory bank;

FIG. 7 depicts the content of a second portion of stream in a second memory bank before the indexation step;

FIG. 8 depicts the indexation table common to the two portions of stream of the two memory banks according to FIGS. 6 and 7, after the phase of joining between the first and the second portion of stream.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Let us firstly recall a few concepts used in the MPEG standard. Firstly, the type I, P or B of the coded pictures is defined as follows:

a picture of I (intra) type or I picture is a picture coded without reference to another picture and for which all the information required for decoding is contained in the picture itself;

a picture of P (predicted) type or P picture is a picture which must be decoded by using the information relating to an earlier I or P reference picture according to the forward order of display (hereinafter, we shall refer to a P picture predicted from an I picture as a "once predicted P picture", to a P picture itself predicted from a once predicted P picture as a "twice predicted P picture" and more generally to a P picture as an "n times predicted P picture" when it is predicted from an I picture via n−1 P pictures;

a picture of B (bidirectional) type or B picture is a picture which must be decoded by using information relating to an earlier or later first and second reference picture (I and/or P) according to the forward order of display.

Consequently, the pictures form elementary groups which are decodable independently of the other elementary groups. A group of pictures, that is to say a GOP, within the meaning of the MPEG standard can contain several of these elementary groups. In fact, it turns out however that a GOP comprises at most one elementary group. B bidirectional pictures can be interpolated between pictures of these elementary groups, then constituting a broken link within the meaning of the standard.

Direct access points associated with start-up codes (sequence codes and sequence extension codes) characterize the start of these elementary groups.

Figure 1:
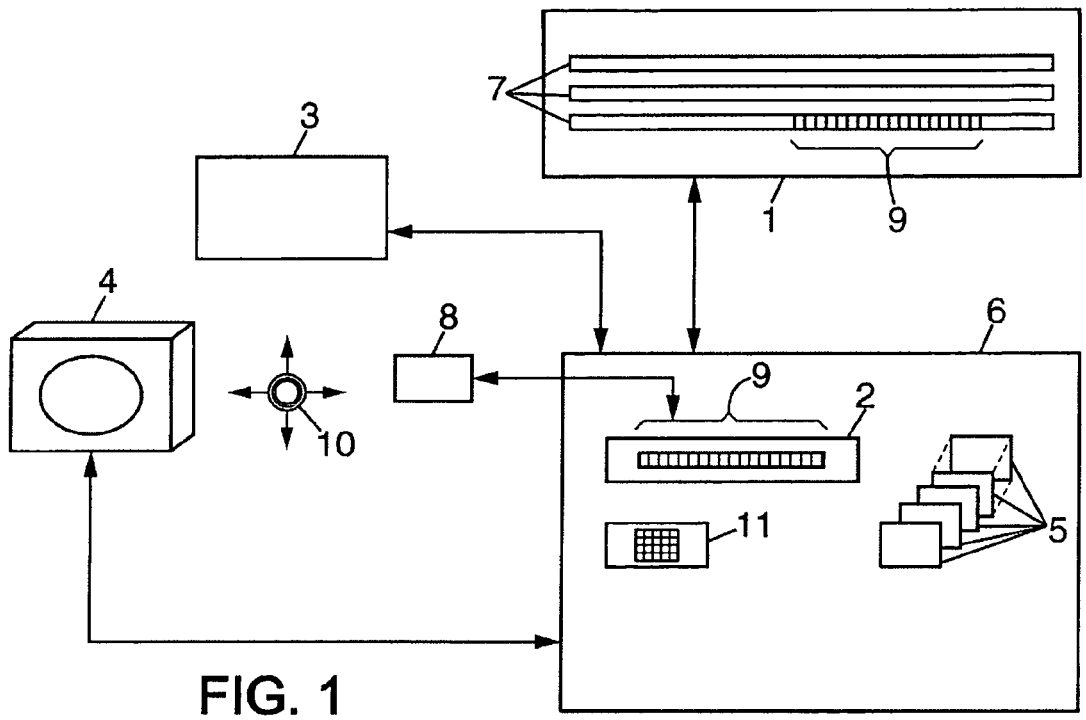
FIG. 1 represents a device making it possible to implement the invention.

FIG. 1 diagrammatically shows a device for the implementation of the process according to the invention.

The device comprises:

a hard disk 1 on which is stored a data stream 7 containing pictures coded according to the MPEG standard;

a memory 6, which comprises:

a buffer memory 2 intended for storing a portion 9 of a compressed stream, and an indexation table 11 to which we shall return later and, frame memories 5 intended for storing the decompressed picture data.

an analyser module 8, adapted for detecting the start-up codes, extracting information from the stream making it possible to locate the pictures in the memory, by giving a departure point to the bytes count used for the locating, a video decoder 3, in particular an MPEG decoder, which is capable of decoding an MPEG picture defined in particular by its position in the buffer memory and whose parameters defining the memory areas where the picture to be decoded must be stored and those where the data of the (decoded) reference pictures required for this decoding must be read, are configurable, a display module 4, adapted for reading the decoded pictures from the memory 6 and translating them into the format used for display, for example the PAL, SECAM or NTSC format. It additionally allows the selection of the frames in the case of interleaved pictures, a monitoring unit 10 which supervises the functioning of the device.

Figure 2:
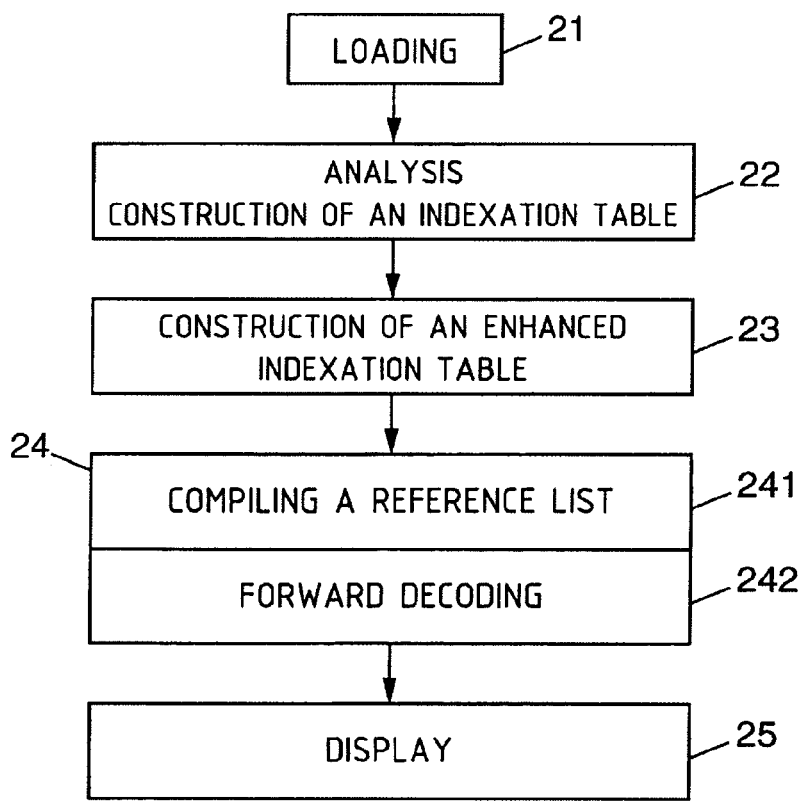
FIG. 2 depicts a schematic depicting the steps of the method according to one embodiment of our invention.

The steps of the method according to the invention will now be explained with reference to the chart of FIG. 2.

The method starts with the reception of a command for backward reading of the pictures contained in the stream 7 stored on the hard disk 1. In a first step 21, the buffer memory 2 is loaded with a first portion 31 (FIG. 1) of the stream 7. These pictures are available in their order of recording on the hard disk and no information about the pictures in particular about their location in this portion 31 is available at this juncture (it is assumed that the demultiplexing/descrambling has been carried out upstream, otherwise an intermediate step of demultiplexing/descrambling must be added).

Next, in a step 22, the portion 31 of stream 7 is analysed with the aid of the analyser module 8, so as in particular to determine information including the position of the start-up codes of the elementary groups, the start address of the picture in the buffer memory 2, for each picture a time stamp associated with a forward order of display, and the type I, P or B of each of the pictures coded in the first portion of stream. This information is stored in an indexation table such as 11 (FIG. 1).

An exemplary indexation table resulting from the implementation of step 22 is given by the array of FIG. 3. It corresponds to a portion of stream 31 originating from a satellite broadcast; the asterisk in pictures no. 2, 14 and 26 signals the presence of a start-up code at the level of these pictures corresponding to the beginning of an elementary group. The buffer memory 2 here contains 28 pictures (here numbered from 0 to 27 to make labelling easier). Picture no. 27 is not complete: only the beginning of the data which code it has been extracted from the stream 7. For each picture, the table contains the address in the buffer memory of the beginning of the picture, the type I, P or B and the time stamp of the picture in the group. In FIG. 3, the pictures are identified by their type I, P or B and by their index numbers for forward display in the elementary group (i.e. for the example considered from 0 to 11); thus, I1, which was broadcast in the stream before B0, is a type I picture which will be displayed (according to a forward order of display) before the type B picture identified by B2 and before the type B picture identified by B0, for the relevant elementary group.

Next, in a step 23, each picture of the stream is allocated a unique identifier. This is for example a number coded on 32 bits (the initialization value being for example h0x80000000) which increases in the forward order of display. Moreover, for each of the pictures identified uniquely in the portion 31 of the stream 7, one determines which are its reference pictures, that is to say the decoded pictures to be obtained so that the relevant picture can be decoded.

Figures 4, 5:
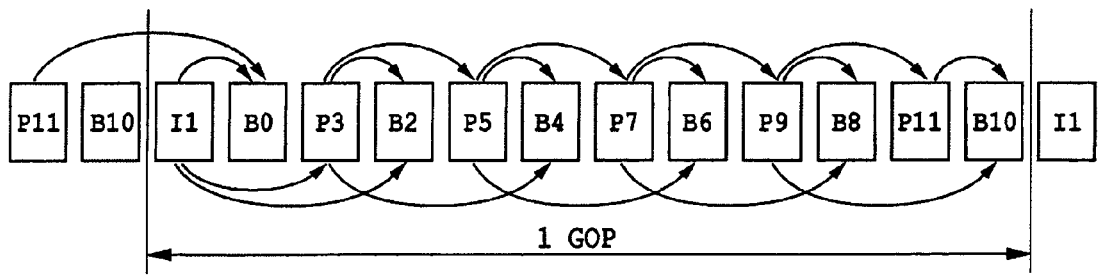
FIG. 4 depicts the indexation table of FIG. 3 in its enhanced version after step c)
FIG. 5 depicts pictures contained in a GOP and the prediction links between the various pictures.

An example of the result of step 23 implemented on the content of the indexation table 11 considered above and illustrated in FIG. 3, is illustrated by the array of FIG. 4, whose position column gives the address of the beginning of each picture in the buffer memory, whose second column indicates the type of picture and the index number for forward display in the corresponding elementary group, whose third column indicates the unique identifier allocated represented in its decimal form for greater readability, whose fourth and fifth columns indicate the respectively earlier and later reference pictures of the P and B type pictures. Thus, for example, to obtain the picture B4 with identifier 65523, the array indicates that the reference pictures P3 with identifier 65522 and P5 with identifier 65524 are required. The question marks indicate that the information is not available; the initial N indicates that no data is required.

In a step 24, a given picture being decoded and currently being displayed, the next picture to be displayed and its address are determined via the information of the indexation table produced in step 22, and this picture is decoded. We consider the following example with regard to the array of FIG. 4: the picture P5 with identifier 65524 is currently being displayed; the next picture to be decoded and displayed is therefore the picture B4 with identifier 65523. To carry out the decoding of the picture B4, the following steps are carried out:

In a step 241, on the basis of the reference pictures of the picture to be decoded B4 with identifier 65523 and of the results of step 23, the (ordered) list of successive reference pictures which have to be decoded onwards of the type I pictures corresponding to an elementary group of pictures start-up code is compiled. This list is called the "reconstruction list". Thus, to obtain B4 with identifier 65523, it is necessary to have P5 with identifier 65524 and P3 with identifier 65522. To have P3 with identifier 65522, it is necessary to have I1 with identifier 65520. To have P5 with identifier 65524, it is necessary to have P3 with identifier 65522, hence to have I1 with identifier 65520. I1 with identifier 65520 is a type I picture, corresponding to a start-up code. The reconstruction list for B4 with identifier 65523 is therefore {B4, P5, P3, I1}, whose identifiers were indicated above.

the next step 242 consists in subsequently carrying out, on the basis of the reconstruction list built in step 241, the MPEG decoding in the forward order of display of the pictures contained in the reconstruction list so as to ultimately carry out the MPEG decoding of the picture B4 with identifier 65523. Thus, this picture B4 is reconstructed by decoding the pictures I1 with identifier

65520, followed by P3 with identifier 65522, followed by P5 with identifier 65524, followed by P4 with identifier 65523.

The last step (step 25) consists, once the decompressed data of B4 with identifier 65523 have been thus obtained, in displaying this picture. The display and decoding steps are done in parallel. In practice, display cannot take place however, at a nominal display speed controlled by the user, until the picture to be displayed has been decoded. Should there be a delay in decoding, the display device therefore continues to display the picture currently being displayed for as long as the next picture to be displayed is not available. Moreover, the decoding can be carried out with a phase lead over the next pictures to be displayed, insofar as the memory resources and the speed of the decoder so permit. For example, while the picture B10 with identifier 65529 is displayed, steps 241 and 242 can, if the memory resources and the speed of the decoder so permit, be implemented so as to decode picture P9 with identifier 65528, followed by B8 with identifier 65527, followed by P7 with identifier 65526 and keep them at the disposal of the display device.

These last steps 24 and 25 are duplicated while there still remain pictures to be displayed which are not decoded among all the pictures contained in the first portion of the stream 31 and for which the information required for decoding is present.

To store the decompressed data of the decoded pictures used during the decoding and display phases, a number of frame memories 5 are used. One of these frame memories is used to gather the data of the picture currently being displayed, the others are used for the decoding of the next picture to be displayed. In an ideal case, the individually decodable element being an elementary group, we need as many frame memories as pictures in an elementary group, generally between 12 and 24.

However, this much memory resource cannot always be made available and it is in practice necessary to limit oneself to a smaller number of frame memories.

It is known that a I picture is itself sufficient hence a frame memory is sufficient to decode an I picture. It is also known that a P picture requires the availability of another picture in order to be decoded, this is why two frame memories are required in order to reconstruct a P picture from its reference. Finally, it is known that a B picture needs two other pictures in order to be decoded, this is why three frame memories are required. Thus, a minimum of four frame memories are necessary and sufficient (one for the storage of the picture currently being displayed and three for the decoding of a next picture to be displayed).

The use of a smaller number of frame memories than the total number of successive decodings required in order to decode a next picture to be displayed signifies that different pictures have to be stored successively in one and the same frame memory, and that data corresponding to a decoded picture must be overwritten as matters proceed; this overwriting signifies the loss of the data of a decompressed picture of the decoded picture which may have to be decoded again later.

Hereinbelow, the present invention provides that the following criteria be applied for the decoding of a next picture to be displayed (this is referred to hereinbelow as the "target picture"), so as to choose the frame memory to be used to store the data of a new picture in the case where none of the frame memories is empty:

the data of a picture, which has already been displayed and which will not be reused for the decoding of a next picture to be displayed, according to the indexation table 11, is overwritten by priority failing this, the data of an I or P picture, which is not required for the decoding currently in progress, which must not be displayed before the target picture and which exhibits a minimum decoding cost, is overwritten, the decoding cost being defined hereinbelow.

In an exemplary implementation, the decoding cost for a picture is:

1 for an I picture,
n+1 for a P picture predicted from n reference pictures,
1 for the B pictures.

FIG. 5 represents a list of pictures referenced in the indexation table represented in the array of FIG. 4. A certain number of these pictures constitute a GOP. The arrows represent the way in which the P and B type pictures are predicted, the arrows pointing from a reference picture to the corresponding predicted picture. Thus, the reference pictures of B2 are P3 and I1, of B4 are P3 and P5, of B6 are P5 and P7; the reference picture of P3 is I1, that of P5 is P3 etc. The costs of decoding the pictures I1, P3, P5, P7, P9, P11 are respectively 1, 2, 3, 4, 5 and 6. The cost of decoding for a B type picture is 1.

Preferably, rules are also applied for optimizing the number of decoding operations to be carried out as a function of those which have already been performed and whose result is still available, by comparing the content of the frame memories with the target picture to be decoded:

if the target picture is present in at least one of the frame memories since it has served for a previous decoding, the target picture is available and does not need to be decoded;

otherwise, the content of the frame memories is compared with the reconstruction list associated with the next target and;

if no picture of the associated reconstruction list is present in one at least of the frame memories, step 242 is carried out on the basis of the I picture direct access point of the associated reconstruction list;

otherwise, step 242 is carried out but beginning with forward MPEG decoding from the picture (or from the pictures in the case where the target picture is a B picture) of highest decoding cost of the reconstruction list contained in one of the decoding frame memories and no longer from the I picture. The reconstruction list generated in step 241 contains only the other pictures to be decoded. For example, P11 being predicted from P9, itself from P7, itself from P3, itself from I1, if P3 is available in a frame memory, then the reconstruction list generated by the decoding of B4 will comprise only three pictures: P7, P9 and P11.

Because only a limited number of frame memories is made available, a degree of synchronization between the decoding procedure and the display procedure is required. The number of pictures to be displayed which are decoded in advance with respect to the one currently being displayed is not deterministic. Specifically, it is recalled that the display and decoding procedures take place in parallel but not independently: the display module displays the next picture to be displayed if it is available, otherwise it waits until it has been decoded by the decoder. The decoder, for its part, decodes the next pictures to be displayed in advance with respect to the display, as long as all the pictures identified in step 22 are not ready to be displayed, and as long as frame memories are available to do this, otherwise it waits until a frame memory can be used.

These last aspects will now be illustrated by again considering the stream portion to be decoded and displayed illustrated by the array of FIG. 4: the aim is to decode and display the picture I1 with identifier 65532 to the picture B4 with identifier 65511; the speed of display is the speed ×1 and the number of frame memories is equal to 4.

Let us assume that the picture I1 with identifier 65532 is currently being displayed, that the frame memories respectively named T1, T2, T3, T4 respectively contain the pictures I1 with identifier 65520 (T1), P5 with identifier 65524 (T2), P3 with identifier 65522 (T3) and I1 with identifier 65532 (T4), and that the next picture to be displayed is the picture P11 with identifier 65530 (the picture with identifier 65531 being incomplete). The aim of the decoding is to obtain the picture P11 with identifier 65530 which has not yet been decoded, followed by the pictures to be displayed thereafter as long as the frame memories are available.

To decode P11 with identifier 65530 which has reconstruction list {I1, P3, P5, P7, P9, P11}, the decoding is started from P5 with identifier 65524 which is available in the frame memory T2. In T1, I1 with identifier 65520 is overwritten, this being the picture not currently being displayed which has the lowest decoding cost for decoding P7 with identifier 65526. Next, P9 with identifier 65528 is decoded, this being in the same way stored in T3, by overwriting P3 with identifier 65522, which is then the picture which has not yet been displayed which has the lowest decoding cost. Next, P11 with identifier 65530 is decoded, this being stored in T2, by overwriting P5 with identifier 65524 for the same reasons.

If the vertical synchronization occurs at this juncture, the picture P11 with identifier 65530 can be displayed. The picture I1 with identifier 65532 is no longer displayed and is no longer a reference picture for a next picture to be displayed; it can therefore be overwritten. The next picture to be displayed is B10 with identifier 65529, decoded on the basis of P9 and P11 which are available in the frame memories T2 and T3 respectively. The reconstruction list for B10 contains just one picture, namely itself. Hence B10 is stored in T4 in place of I1, waiting for the next synchronization of the vertical synchronization signal.

The next picture to be decoded is P9 with identifier 65528, available in the frame memory T2. The next picture to be decoded is then B8, decoded on the basis of P9 and P7. The reconstruction list contains just a single picture: itself. Now, at this juncture the memories T1, T2, T3, T4 respectively contain the pictures P7, P9, P11 and B10, and it is P11 which is currently being displayed. No frame memory is therefore available to store B10. It is therefore necessary to wait for the next vertical synchronization in order to decode this picture, which will be stored in the frame memory T3.

Advantageously, the buffer memory 2 can be split into two sub-memories or memory banks and steps 24 and 25 can be executed on a first portion of the data stream, which portion is contained in a first sub-memory, at the same time as steps 22 and 23 are executed on a second portion (coming afterwards in the backward order of display) of the data stream, this next portion being contained in a second sub-memory. During this step 22, the content of the two sub-memories is compared so as to be sure that the first and second portions of the stream are indeed consecutive, and the indexation table for the first portion of the stream in the first sub-memory is completed and updated with the next information relating to the second portion of the stream, while the information relating to the pictures already displayed and which is no longer used is subsequently erased.

A single indexation table is thus considered and contains the useful information relating to the two considered portions of the stream.

Advantageously, the two portions of the stream may overlap partially, so as to find a common picture in which the join can be made, this making it possible to circumvent the difficulty in carrying out accurate slicings of the stream. This is advantageous, in particular for a scrambled data stream.

Each of the portions of the data stream is replaced again only once it has been possible to display the entire set of pictures contained in the portion and when it is no longer required for the decoding of the pictures contained in the other portion.

FIG. 6 illustrates the content of an indexation table of a first sub-memory on which the decoding procedure takes place while a new stream portion illustrated by FIG. 7 is loaded into the other sub-memory, this new portion of the stream corresponding to the next pictures to be displayed in the backward order of display. The last picture of the new portion is not complete but this is not problematic since this picture is still available as first picture of the other portion. The join between the two portions of stream is made at the level of this picture. Next, step 22 is performed by updating the indexation list from which the pictures of the first portion of stream which have already been decoded and displayed have moreover been removed: the resulting list is illustrated by the array of FIG. 8.

Once the pictures with identifier 66506 to 65510 have been displayed, a new portion of stream is loaded into the first sub-memory.

The size of each sub-memory can lie for example between 512 kilobytes and 1 megabyte, thus enabling them to store at least one GOP.

The method set forth hereinabove provides methods for optimized decoding of all the pictures to be displayed in rewind mode. Certain portions of stream, for example those having many predicted pictures and few direct access points would nevertheless require both a very substantial allotted memory capacity and a very fast decoder in order to be decoded fully. The present invention consequently provides decision criteria whose consequence is the non-decoding and hence the non-display of certain portions of stream.

Firstly, when two consecutive portions of stream contain no direct access point, the portions are regarded as non-decodable and the buffer memories are then loaded with new portions of stream. Furthermore, if an error in the stream is detected for example by causing a syntax violation in the decoding procedure, the picture concerned is discarded from the decoding and likewise the pictures onwards of this picture (which are identified in steps 22 and 23) when dealing with an I or P picture.

Next, as certain pictures exhibit high decoding costs (7 or 8), it is possible that a standard decoder having a memory capacity of four frame memories may not be able to supply the display device with the decoded picture, in the theoretical time associated with the display speed chosen by the user (for example 25 pictures a second for a display speed ×1). In this case, the display device freezes the picture currently being displayed and continues the displaying of the program when the next picture is available.

Furthermore, an advantageous mode of implementation of the method of the present invention provides the calculation of any delay which may be taken with respect to an instructed display speed and the determination, in step 241, of the next picture to be displayed in such a way as to cancel the delay. The cancellation of the delay is achieved by skipping pictures (that is to say by not decoding them and by not displaying them), for example according to the following priority rules:

one or more B pictures is or are skipped by priority;
if the skip of B pictures is not sufficient to cancel the delay, then one or more P pictures is or are skipped;

if the skip of P pictures is still not sufficient to cancel the delay, a portion of the compressed data stream is skipped during the reading, in step 21, of a next part of this data stream on the mass storage digital medium.

These skip and delay calculation mechanisms make it possible to retain the same algorithm for backward decoding in rewind mode regardless of the rewind reading speed chosen by the user; the skips may be frequent in the case of reading at high speed.

For example, again considering the list, illustrated by the array of FIG. 4, of pictures to be displayed, it is assumed that the picture I1 with identifier 65532 is currently being displayed, that the backward display speed is ×1 and that the decoding of the picture to be displayed next, that is to say P11 with identifier 65530, which has a considerable decoding cost. Let us furthermore assume that the decoder has a relatively slow speed and supplies the decoded picture P11 with a certain delay with respect to the display speed, during which the device freezes the picture I1. So, instead of decoding the picture B10 with identifier 65529, it will go directly to the decoding of the picture P9 with identifier 65528.

With backward display speeds which differ from the speed ×1, but with ratios between the speed ×1 and the selected speed of type M/N, where M and N are integers, this time by considering the picture at the level of its two frames, it is possible to determine which frame is closer to that to be displayed at the nominal speed and thus to assess the delay.

For example, with a speed ×2, only one picture out of two is displayed, with a speed ×3, one picture is displayed, and the next two are skipped. With a speed ×0.5, the same picture is displayed twice.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for decoding and displaying MPEG pictures in a rewind speed mode, the method comprising:
   receiving a stream of picture data compressed according to a MPEG standard using a specified number N of frame memories, wherein each of the memories are adapted for storing a decoded picture, and wherein N is an integer greater than 3;
   allocating frame memories when one of the frame memories is to be overwritten so as to permit storage of a new picture to be decoded as follows;
      overwriting based on a priority, a frame memory a picture which has already been displayed and which is no longer required for performing a next picture decoding;
      overwriting based on a priority, a frame memory, in which a picture which exhibits a minimum decoding cost is stored;
      not overwriting a frame memory, in which a picture which is currently being displayed is stored;
      not overwriting a frame memory, in which a picture which is ready for display but has not yet been displayed is stored; and
      not overwriting a frame memory, in which a reference picture required for decoding of a new picture to be decoded is stored;
   wherein if no frame memory as allocated above can be overwritten, then suspending the decoding the until a picture is displayed and the frame memories are re-allocated as after this display as characterized above.

2. The method according to claim 1, wherein the stream of picture data includes predicted pictures comprising type I pictures and type P pictures;
   wherein the type I pictures exhibit a first specified decoding cost;
   wherein the type P pictures predicted from a type I picture exhibit a second decoding cost, greater than the first decoding cost; and
   wherein the type P pictures predicted from another type P picture exhibit a decoding cost greater than a decoding cost of an other type P picture.

3. The method according to claim 2, wherein the stream of picture data includes predicted pictures comprising type B pictures and wherein the type B pictures exhibit the first decoding cost.

4. The method according to claim 1, wherein a check is carried out to verify whether a new picture to be decoded is not already stored in any one of the frame memories before decoding the new picture.

5. The method according to claim 1, further comprising:
   determining at each picture display synchronization event whether a picture which is ready for display is present in one of the frame memories;
   if the picture which is ready for display is present in one of the frame memories then displaying the picture and marking it as obsolete if the picture is no longer required in order to perform a picture decoding; and
   if the picture which is ready for display is not present in one of the frame memories then repeating the displaying of a picture displayed at a previous picture display synchronization event.

6. The method according to claim 1, wherein the receiving a stream of picture data compressed according to a MPEG standard includes reading portions from a mass storage digital medium, in response to a rewind mode read command.

7. The method according to claim 1, further comprising:
   a) loading a portion of the stream into a buffer memory;
   b) analysing a portion of the stream so as to identify an access point of a decodable group of pictures and to determine at least for each of the pictures of the group, information including an address of the picture in the buffer memory, a presentation time stamp associated with an order of forward display of the picture, and one of a type I picture, type P picture, and type B picture, and storing the information in an indexation table;
   c) obtaining an enhanced indexation table by supplementing the indexation table obtained in step b by specifying for each picture of type P picture and type B picture each one or more pictures referenced;
   d) determining, from the indexation table, for a next picture to be displayed, a reconstruction list which is an ordered list of the reference pictures to be decoded sequentially onwards of the access point so as to obtain a next picture to be displayed; and
   e) obtaining, from the reconstruction list, the next picture to be displayed by decoding one or more of the pictures of the reconstruction list.

8. The method according to claim 7, further comprising between step b) and step c), the following:
   allocating to each of picture in a first portion of the stream a unique identification number enabling the picture to be identified in the stream.

9. The method according to claim 8, wherein in step d), the next picture to be displayed is determined from the unique identification number.

10. The method according to claim 7, further comprising:
verifying, to obtain the next picture to be displayed, whether at least one of the pictures of the reconstruction list associated with the next picture to be displayed is not already stored in one of the frame memories, and if the next picture to be displayed is not already stored in one of the frame memories then a sequential decoding of the pictures of the list is commenced not from the access point of a decodable group of pictures but from a picture stored in the frame memories.

11. The method according to claim 7, further comprising:
calculating a delay, with respect to a theoretical display speed, each time a picture is displayed, and wherein step d), the next picture to be displayed is determined in such a way as to cancel the delay by skipping pictures, as follows:
skipping one or more B type pictures by priority;
wherein if one or more skips of B type pictures is not sufficient to cancel the delay, then one or more P pictures are skipped;
wherein if one or more skips of P pictures are not sufficient to cancel the delay, then one or more portions of the data stream are skipped during the loading, in step a), of a next portion of the data stream into the buffer memory.

12. The method according to claim 7, wherein the buffer memory comprises a first memory bank and a second memory bank, and in that steps d) and e) are carried out in the first memory bank of the buffer memory for a first portion of the stream, while steps a) to c) are carried out in the second memory bank of the buffer memory for a second portion of the stream.

13. The method according to claim 12, wherein at least one of the first memory bank and the second memory bank is not overwritten in step a) as long as the data therein is still required for the processing of the data contained in the other of the first memory bank and the second memory bank.

14. The method according to claim 12, further comprising:
overwriting one of the first and second memory banks with a new portion of the stream in step a), as soon as the data therein is no longer required for the processing of the data contained in the other of the first memory bank and the second memory bank.

15. The method according to claim 12, wherein portions of the stream loaded into the first memory bank and into the second memory bank overlap, so as to form a join between the portions loaded in the first memory bank and the second memory bank is made at a level of a common picture.

16. The method according to claim 12, wherein the indexation tables relating to portions of the stream portions loaded into the first memory bank and into the second memory bank constitute a single indexation table.

17. A playback device for decoding and for displaying MPEG picture in a rewind mode, the device comprising:
an input for receiving a stream of picture data compressed according to a MPEG standard using a specified number N of frame memories, wherein each of the memories are adapted for storing a decoded picture, and wherein N is an integer greater than 3;
a means for allocating the frame memories when one of the frame memories is to be overwritten so as to permit storage of a new picture to be decoded as follows;
a frame memory in which a picture which has already been displayed and which is no longer required for performing a next picture decoding, is overwritten by priority;
a frame memory, in which a picture which exhibits a minimum decoding cost is stored, is overwritten by priority;
a frame memory, in which a picture which is currently being displayed is stored, cannot be overwritten;
a frame memory, in which a picture which is ready for display but has not yet been displayed is stored, cannot be overwritten; and
a frame memory, in which a reference picture required for the decoding of the new picture to be decoded is stored, also cannot be overwritten;
wherein if no frame memory as allocated above can be overwritten, then suspending the decoding until a picture is displayed and the frame memories are re-allocated as characterized above.

18. The playback device according to claim 17, wherein the stream of picture data includes predicted pictures comprising type I pictures and type P pictures;
wherein the type I pictures exhibit a first specified decoding cost;
wherein the type P pictures predicted from a type I picture exhibit a second decoding cost, greater than the first decoding cost; and
wherein the type P pictures predicted from another type P picture exhibit a decoding cost greater than a decoding cost of an other type P picture.

19. The playback device according to claim 18, wherein the stream of picture data includes predicted pictures comprising type B pictures and wherein the type B pictures exhibit the first decoding cost.

20. The playback device according to claim 17, further comprising:
means for verifying that a new picture to be decoded is not already stored in any one of the frame memories before decoding the new picture.

21. The playback device according to claim 17, further comprising:
means for determining at each picture display synchronization event whether a picture which is ready for display is present in the frame memories;
if the picture which is ready for display is present in one of the frame memories then displaying the picture and marking it as obsolete if the picture is no longer required in order to perform a picture decoding; and
if the picture which is ready for display is not present in one of the frame memories then repeating the displaying of a picture displayed at a previous picture display synchronization event.

22. The playback device according to claim 17, wherein the means for receiving a stream of picture data compressed according to a MPEG standard includes reading portions from a mass storage digital medium, in response to a rewind mode read command.

23. The playback device according to claim 17, further comprising:
a) means for loading a portion of the stream into a buffer memory;
b) means for analysing the portion of the stream so as to identify an access point of a decodable group of pictures and to determine at least for each of the pictures of the group, information including an address of the picture in the buffer memory, a presentation time stamp associated with an order of forward display of the picture, and one of a type I picture , type P picture P, and type B picture, and storing the information in an indexation table;
c) means for obtaining an enhanced indexation table by supplementing the indexation table obtained in step b by specifying for each picture of type P picture and type B picture each one or more pictures referenced;

d) means for determining from the indexation table, for a next picture to be displayed, a reconstruction list which is an ordered list of the reference pictures to be decoded sequentially onwards of the access point so as to obtain the next picture to be displayed;

e) means for obtaining from the reconstruction list, the next picture to be displayed by decoding one or more of the pictures of the reconstruction list.

24. The playback device according to claim 23, further comprising:

means for allocating a unique identification number to each of picture according to an order of display of the pictures.

25. The device according to claim 24, wherein the means for determining the next picture to be displayed from the unique identification number.

26. The device according to claim 23, further comprising:

means for verifying, to obtain the next picture to be displayed, whether at least one of the pictures of the reconstruction list associated with the next picture to be displayed is not already stored in one of the frame memories, and if the next picture to be displayed is not already stored in one of the frame memories then a sequential decoding of the pictures of the list is commenced not from the access point of a decodable group of pictures but from a picture stored in the frame memories.

27. The playback device according to claim 23, further comprising calculating a delay, with respect to a theoretical display speed, each time a picture is displayed, and wherein step d), the next picture to be displayed is determined in such a way as to cancel the delay by skipping pictures, as follows:

skipping one or more B type pictures by priority;

wherein if one or more skips of B type pictures is not sufficient to cancel the delay, then one or more P pictures are skipped;

wherein if one or more skips of P pictures are not sufficient to cancel the delay, then one or more portions of the data stream are skipped during the loading, in step a), of a next portion of the data stream into the buffer memory.

28. The playback device according to claim 23, wherein the buffer memory comprises a first and a second memory bank, and in that the means for changing and the means for analysing operate in the first memory bank of the buffer memory for a first portion of the stream, while the means for obtaining the indexation table, and the means for obtaining the next picture to be displayed operate in the second memory bank of the buffer memory for a second portion of the stream.

29. The playback device according to claim 28, further comprising:

means for preventing the overwriting of, any one of the first memory bank and the second memory bank as long as the data therein is still required for processing data contained in the other of the first memory bank and the second memory bank.

30. The playback device according to claim 28, further comprising:

means for overwriting one of the first and second memory banks with a new portion of the stream in step a), as soon as the data therein is no longer required for the processing of the data contained in the other of the first memory bank and the second memory bank.

31. The device according to claim 28, wherein portions of the stream loaded into the first memory bank and into the second memory bank overlap, so as to form a join between these portions at the level of a common picture.

32. The device according to claim 28, further comprising:

means for combining into a single indexation table the indexation tables relating to each of portion of the stream loaded into the first memory bank and into the second memory bank.

33. The playback device according to claim 17, further comprising:

a video driver circuit.

34. The playback device according to claims 33, further comprising:

a decoder box.

35. A set-top box for decoding and for displaying MPEG picture in a rewind mode, the device comprising:

a video driver circuit;

an input for receiving a stream of picture data compressed according to a MPEG standard using a specified number N of frame memories, wherein each of the memories are adapted for storing a decoded picture, and wherein N is an integer greater than 3;

a means for allocating the frame memories when one of the frame memories is to be overwritten so as to permit storage of a new picture to be decoded as follows;

a frame memory in which a picture which has already been displayed and which is no longer required for performing a next picture decoding, is overwritten by priority;

a frame memory, in which a picture which exhibits a minimum decoding cost is stored, is overwritten by priority;

a frame memory, in which a picture which is currently being displayed is stored, cannot be overwritten;

a frame memory, in which a picture which is ready for display but has not yet been displayed is stored, cannot be overwritten; and a frame memory, in which a reference picture required for the decoding of the new picture to be decoded is stored, also cannot be overwritten;

wherein if no frame memory as allocated above can be overwritten, then suspending the decoding until a picture is displayed and the frame memories are re-allocated as characterized above.

* * * * *

UNITED STATES PATENT AND TRADEMARK OFFICE
CERTIFICATE OF CORRECTION

PATENT NO. : 7,430,361 B2
APPLICATION NO. : 10/741821
DATED : September 30, 2008
INVENTOR(S) : Frederic Roelens It is certified that error appears in the above-identified patent and that said Letters Patent is hereby corrected as shown below:

Title Page,
Please make the following changes:

Insert: --(73) Assignee: STMicroelectronics S.A., Montrouge (FR)--

Insert: --(74) *Attorney, Agent or Firm* – Lisa K. Jorgenson; Jon A. Gibbons; Fleit Gibbons Gutman Bongini & Bianco P.L.--

Signed and Sealed this

Thirtieth Day of December, 2008

JON W. DUDAS
*Director of the United States Patent and Trademark Office*